United States Patent
Endries et al.

(10) Patent No.: US 6,824,351 B2
(45) Date of Patent: Nov. 30, 2004

(54) METHOD AND DEVICE FOR COOLING THE INFLOW AREA OF THE SHAFT OF A STEAM TURBINE

(75) Inventors: Hans-Joachim Endries, Essen (DE); Udo Gande, Goch (DE); Volker Taubitz, Muelheim A.D. Ruhr (DE); Michael Wechsung, Muelheim A.D. Ruhr (DE)

(73) Assignee: Siemens Aktienegesellschaft, Munich (DE)

( * ) Notice: Subject to any disclaimer, the term of this patent is extended or adjusted under 35 U.S.C. 154(b) by 14 days.

(21) Appl. No.: 10/275,109

(22) PCT Filed: Apr. 23, 2001

(86) PCT No.: PCT/EP01/04577
§ 371 (c)(1),
(2), (4) Date: Nov. 1, 2002

(87) PCT Pub. No.: WO01/86122
PCT Pub. Date: Nov. 15, 2001

(65) Prior Publication Data
US 2003/0097841 A1 May 29, 2003

(30) Foreign Application Priority Data
May 5, 2000 (EP) .............................. 00109647

(51) Int. Cl.$^7$ ............................................. F01D 25/12
(52) U.S. Cl. ..................................... 415/115; 416/96 R
(58) Field of Search ............................. 415/1, 115, 116, 415/117, 47, 180; 416/1, 39, 95, 96 R

(56) References Cited

U.S. PATENT DOCUMENTS

| 3,582,230 A | * | 6/1971 | Schmidt et al. ............. 415/117 |
| 4,498,301 A | | 2/1985 | Tsubouchi |
| 5,490,386 A | | 2/1996 | Keller et al. |

FOREIGN PATENT DOCUMENTS

| DE | 198 23 251 | 5/1998 | |
| JP | 08338205 | 6/1995 | |
| JP | 07332020 A | * 12/1995 | ........... F01K/23/10 |
| WO | 97/08431 | 8/1996 | |

* cited by examiner

Primary Examiner—Edward K. Look
Assistant Examiner—Igor Kershteyn
(74) Attorney, Agent, or Firm—Harness, Dickey & Pierce, P.L.C.

(57) ABSTRACT

A method and a device are for cooling the inflow area of the shaft of a steam turbine. According to the method and device, a partial mass flow $m_1$ is branched off upstream of a feed device that supplies the steam to the team turbine. The partial mass flow is cooled and then guided to the feed device, from where it is supplied to the steam turbine together with the remaining mass flow $m_2$. The method and device allow for a simplified control and design of the turbine.

33 Claims, 2 Drawing Sheets

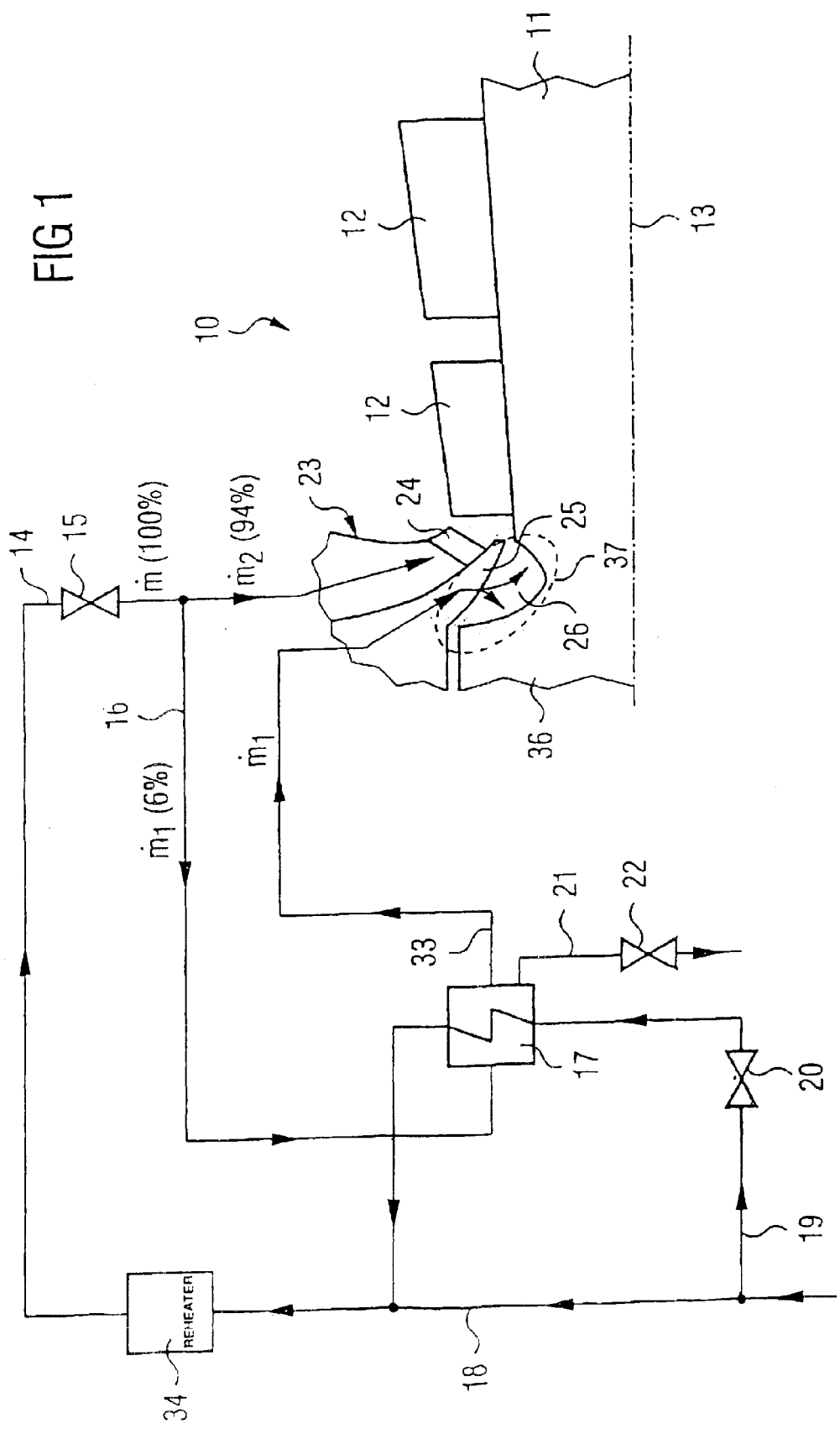

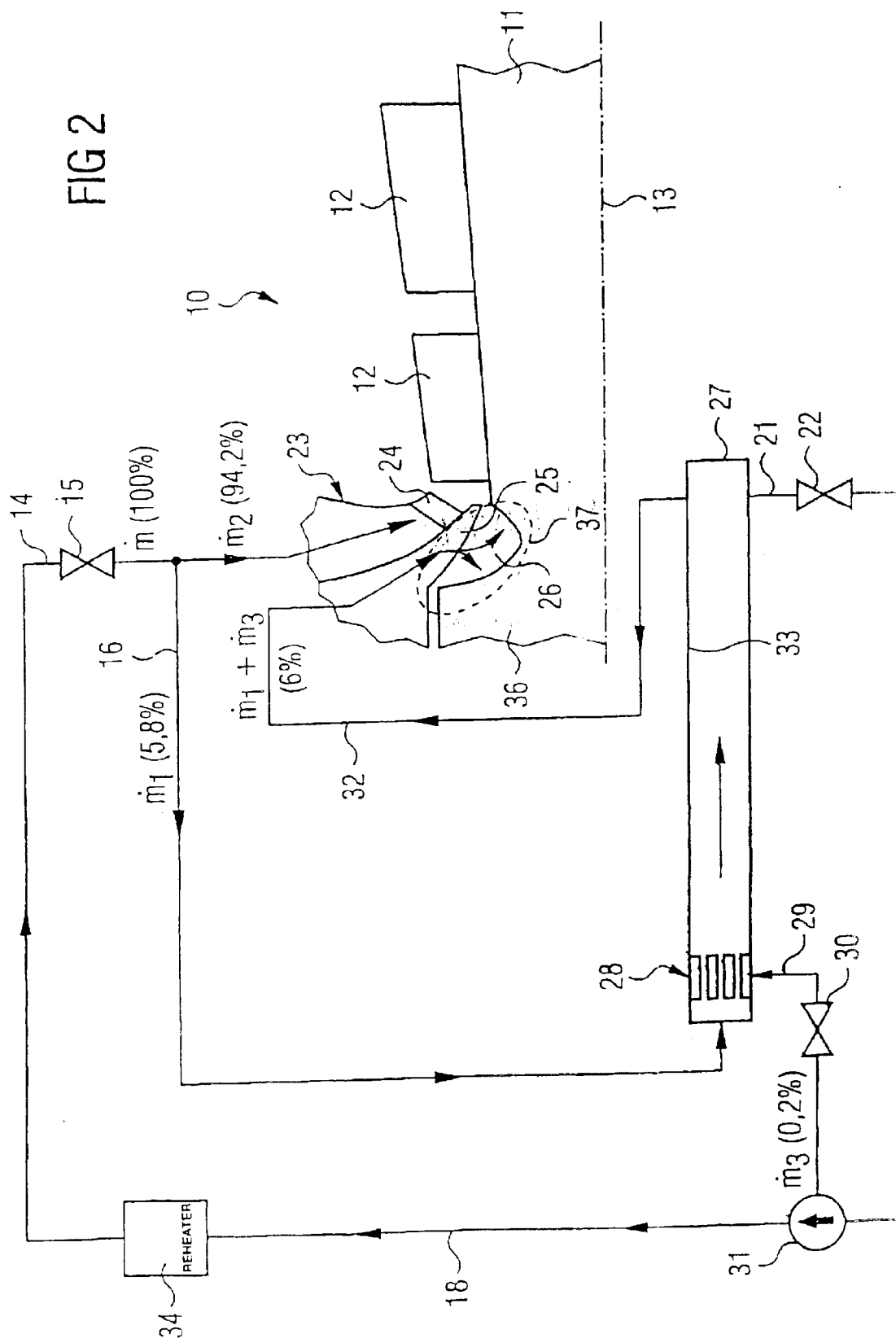

METHOD AND DEVICE FOR COOLING THE INFLOW AREA OF THE SHAFT OF A STEAM TURBINE

This application is the national phase under 35 U.S.C. § 371 of PCT International Application No. PCT/EP01/04577 which has an International filing date of Apr. 23, 2001, which designated the United States of America and which claims priority on European Patent Application number EP 00109647.8 filed May 5, 2000, the entire contents of which are hereby incorporated herein by reference.

FIELD OF THE INVENTION

The present invention generally relates to a method and an appliance for cooling a shaft region at an inlet flow to a steam turbine.

BACKGROUND OF THE INVENTION

DE 198 23 251 C1, from the same applicant describes a method and an appliance for cooling a shaft region at the inlet flow to a low-pressure stage of a steam turbine. This publication proposes the injection of a cooling medium, in particular condensate or steam from a cooling system, into the low-pressure stage as a function of the relationships in the low-pressure stage.

A disadvantageous feature of this known procedure is that the injection of the cooling medium and the supply of the live steam have to be controlled separately and independently of one another. For this reason, quick-acting stop valves are necessary for both the cooling medium and the live steam. These valves must be triggered substantially simultaneously and must close substantially simultaneously in order to ensure the necessary protection against excess rotational speed and excessively high condenser pressure. The result is a complicated design and control system.

SUMMARY OF THE INVENTION

An object of an embodiment of the present invention includes, therefore, to make available a simple method for cooling the shaft region at the inlet flow to a steam turbine. In addition, an appliance may be, in one embodiment, made available for cooling the shaft region at the inlet flow location, which appliance has a simple structural design.

A concept of an embodiment of the invention provides for the live steam flow supplied to the steam turbine to be divided. A partial mass flow is branched off, cooled and returned, whereas the residual mass flow is supplied directly. In order to realize the method according to an embodiment of the invention, particular provision is made for a partial mass flow to be branched off upstream of a supply system for steam to the steam turbine, cooled and subsequently conducted to the supply system and from the latter, together with the residual mass flow, into the steam turbine. The device according to an embodiment of the invention provides for the live steam main to have a branch for extracting a partial mass flow to be cooled, which branch returns to the supply system downstream of a cooling device for the partial mass flow.

In consequence, it is now only necessary to provide one quick-acting stop valve, which is arranged upstream of the branch. It is therefore possible to dispense with a further quick-acting stop valve for an injected cooling medium. The structural design and the control system are substantially simplified.

In an advantageous embodiment, the partial mass flow branched off is less than 10% of the mass flow supplied and is, in particular, located between 5% and 7% of the mass flow supplied. This avoids branching off an unallowably high partial mass flow and, therefore, avoids a reduction in the power of the steam turbine.

A fluid extracted from a principal feed main is advantageously used for cooling the partial mass flow. The fluid is extracted upstream of a steam generator or a reheater. An additional supply main is unnecessary.

In an advantageous first development, the partial mass flow is cooled in a heat exchanger. The fluid extracted from a principal feed main is conducted through the heat exchanger and heated in the process. It is then advantageously returned to the principal supply main upstream of the steam generator or the reheater. There are therefore no heat losses.

According to an advantageous second development, the partial mass flow is cooled by injecting a flow of water. In this arrangement, the temperature of the partial mass flow is generally so high that the flow of water injected is completely evaporated and then conducted, together with the partial mass flow branched off, to the supply system and from the latter into the steam turbine. Here again, therefore, there are no heat losses.

According to an advantageous embodiment, the temperature of the cooled partial mass flow is measured downstream of the cooling location. The temperature of the partial mass flow can therefore be set in a targeted manner to a predefined required value so that an open-chain or closed-loop control of the temperature is also possible. The required value is advantageously fixed as a function of the conditions in the steam turbine to be cooled.

In an advantageous development, the cooled partial mass flow and the residual mass flow are fed into the steam turbine separately from one another. The partial mass flow can then be conducted in a targeted manner to those locations at which cooling is necessary. The residual mass flow can, on the other hand, be conducted directly to the steam turbine blading.

In the appliance according to an embodiment of the invention, the branch leads from the live steam feed to a heat exchanger, which is cooled by a fluid extracted from the principal feed main. As an alternative, the branch can lead to a cooling chamber, into which water extracted from a principal feed main can be injected. A further supply conduit is unnecessary. In addition, the heat extracted from the partial mass flow remains in the system.

A temperature sensor for measuring the temperature of the cooled partial mass flow is advantageously arranged downstream of the cooling location. In this way, the partial mass flow can be cooled in a targeted manner to a specified temperature, which is in turn specified as a function of the conditions in the steam turbine. In this arrangement, the temperature sensor can be part of a temperature closed-loop circuit or a temperature control device.

In an advantageous embodiment, the heat exchanger or the cooling chamber is provided with a drainage system. The drainage system permits the removal of condensate and, therefore, disturbance-free uninterrupted operation.

According to an advantageous development, the supply system has a nozzle for the residual mass flow and a further nozzle for the cooled partial mass flow. Any mixing of the two mass flows is avoided. The cooled partial mass flow can therefore be conducted in a targeted manner into the shaft region (which has to be cooled) at the inlet flow location, whereas the residual mass flow can be deflected directly onto the steam turbine blading.

BRIEF DESCRIPTION OF THE DRAWINGS

The invention is described in more detail below using exemplary embodiments which are diagrammatically represented in the drawings. The same designations are used for similar or functionally identical components. In the drawings:

FIG. 1 shows a diagrammatic representation of an appliance according to the invention in a first embodiment; and FIG. 2 shows a diagrammatic representation of an appliance according to the invention in a second embodiment.

DETAILED DESCRIPTION OF THE PREFERRED EMBODIMENTS

FIG. 1 diagrammatically represents a steam turbine 10 with a rotor 11 and rotor blades 12. The rotor 11 can rotate about a center line 13. The steam necessary for driving the steam turbine 10 is supplied by means of a live steam feed 14 with a quick-acting stop valve 15. The live steam feed 14 is supplied by means of a principal feed main 18 and a steam generator or reheater 34. The quick-acting stop valve 15 is connected between the steam generator or reheater 34 and a supply system 23 for steam to the steam turbine 10. If the steam turbine 10 has to be shut down, the whole of the steam supply can be interrupted by closing the quick-acting stop valve 15.

In order to cool a shaft region 37, which is located at the inlet flow to the steam turbine 10 and is indicated by dashed lines, the total mass flow $\dot{m}$ supplied is divided into partial mass flows $\dot{m}_1$, $\dot{m}_2$ upstream of the supply system 23. A partial mass flow $\dot{m}_1$ is branched off by means of a branch 16 and conducted to a heat exchanger 17. Water is extracted for cooling purposes, by means of a feed conduit 19, from the principal feed main 18. The feed conduit 19 can be closed by means of a valve 20. At the outlet from the heat exchanger 17, the water extracted is fed back into the principal feed main 18 upstream of the steam generator or reheater 34. The heat extracted from the partial mass flow $\dot{m}_1$ is therefore retained. The cooled partial mass flow $\dot{m}_1$ is conducted back to the supply system 23 and from the latter into the steam turbine 10.

The heat exchanger 17 is provided with a drain conduit 21 with a valve 22. Condensate possibly occurring in the heat exchanger 17 can be removed by means of the drain conduit 21.

The supply system 23 has a first nozzle 24 for the residual mass flow $\dot{m}_2$ and a second nozzle 25 for the cooled mass flow $\dot{m}_1$ which was branched off. The nozzle 24 conducts the residual mass flow $\dot{m}_2$ to the rotor blades 12 of the rotor 11 and puts the rotor into rotation. The nozzle 25 conducts the cooled partial mass flow $\dot{m}_1$ into a groove 26 extending round the rotor 11 in the peripheral direction in the region of the supply system 23. The rotor 11, and therefore the shaft of the steam turbine 10, are therefore reliably cooled in the shaft region 37 at the inlet flow location. A piston 36, in particular, which is necessary for balancing the thrust in the axial direction, is cooled.

The proportion of the partial mass flow $\dot{m}_1$ in the mass flow $\dot{m}_1$ supplied in total is between 5% and 7%, in particular 6%.

In the exemplary embodiment according to FIG. 2, a partial mass flow $\dot{m}_1$ is again branched off and is supplied to a cooling chamber 27. Two-phase cooling 28, in which water 29 extracted from the principal feed main 18 is injected, is provided in the cooling chamber 27. The water is supplied by means of a feed-water conduit 29 with a quick-acting control valve 30 and a pump 31. This permits highly accurate metering of the water flow $\dot{m}_3$ supplied.

The injected water flow $\dot{m}_3$ evaporates in the cooling chamber 27 and mixes with the partial mass flow $\dot{m}_1$. The two mass flows $\dot{m}_1+\dot{m}_3$ are then supplied, via a further conduit 32, to the nozzle 25 of the supply system 23.

The partial mass flow $\dot{m}_1$ in the exemplary embodiment according to FIG. 2 is somewhat smaller than that in the exemplary embodiment according to FIG. 1. The reason for this is that due to the injection of the water flow $\dot{m}_3$, a larger mass flow $\dot{m}_1+\dot{m}_3$ is supplied to the steam turbine 10 than is supplied in the case of the exemplary embodiment according to FIG. 1. In the exemplary embodiment according to FIG. 2, the partial mass flow $\dot{m}_1$ branched off can, for example, be 5.8% of the mass flow m supplied, whereas the water flow $\dot{m}_3$ is 0.2%. In both embodiments (FIG. 1 and FIG. 2), a measurement location 33 for recording the temperature of the partial mass flow $\dot{m}_1$ or $\dot{m}_1+\dot{m}_3$ is provided downstream of the cooling location, i.e. downstream of the heat exchanger 18 or the two-phase cooling system 28. The temperature measured at the measurement location 33 is compared with a specified required value. The admission to the heat exchanger 17 or to the two-phase cooling system 28 is adapted as a function of the result of this comparison. The temperature of the cooled partial mass flow $\dot{m}_1$ or $\dot{m}_1+\dot{m}_3$ supplied to the steam turbine 10 can be held in a targeted manner at the respectively desired temperature by means of this procedure and can therefore be adapted to the conditions in the steam turbine 10.

If the steam turbine 10 has to be shut down, it is only necessary to close the quick-acting stop valve 15. This interrupts any live steam supply to the steam turbine 10. The closing of the valve 20, 30 can take place without difficulty and with little delay. Damage is not to be expected. In the case of the embodiment according to FIG. 2, in particular, excessive injected water can be removed by means of the drain conduit 21. There is no need for a separate quick-acting stop valve for shutting off a cooling medium which is supplied to the steam turbine 10 separately from the mass flow $\dot{m}$ supplied overall. The structural design and the control system are therefore substantially simplified.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for cooling, comprising:
   branching off a partial mass flow upstream of a supply system for supplying steam to the steam turbine;
   cooling the partial mass flow; and
   subsequently guiding the cooled partial mass flow, together with a residual mass flow, to the steam turbine, wherein the partial mass flow is less than 10% of a total mass flow supplied.

2. The method as claimed in claim 1, wherein the partial mass flow is cooled in a heat exchanger.

3. The method as claimed in claim 2, wherein a temperature of the cooled partial mass flow is measured downstream of the cooling location.

4. The method as claimed in claim 1, wherein the partial mass flow is less than 5% of a total mass flow supplied.

5. The method as claimed in claim 1, wherein the partial mass flow is less than 7% of a total mass flow supplied.

6. The method as claimed in claim 1, wherein fluid extracted from a principal feed main is used for cooling the partial mass flow.

7. The method as claimed in claim 1, wherein the partial mass flow is cooled in a heat exchanger.

8. The method as claimed in claim 1, wherein the partial mass flow is cooled by injecting a flow of water.

9. The method as claimed in claim 1, wherein a temperature of the cooled partial mass flow is measured downstream of the cooing location.

10. The method as claimed in claim 1, wherein the cooled mass flow and the residual mass flow are fed, separately from on another, into the steam turbine.

11. A method for cooling, comprising:
 branching off a partial mass flow upstream of a supply system for supplying steam to the steam turbine;
 cooling the partial mass flow; and
 subsequently guiding the cooled partial mass flow, together with a residual mass flow, to the steam turbine, wherein fluid extracted from a principal feed main is used for cooling the partial mass flow.

12. The method as claimed in claim 11, wherein the partial mass flow is cooled in a heat exchanger.

13. The method as claimed in claim 11, wherein the partial mass flow is cooled by injecting a flow of water.

14. The method as claimed in claim 11, wherein a temperature of the cooled partial mass flow is measured downstream of the cooling location.

15. The method as claimed in claim 11, wherein the cooled partial mass flow and the residual mass flow are fed, separately from one another, into the steam turbine.

16. A method for cooling, comprising:
 branching off a partial mass flow upstream of a supply system for supplying steam to the steam turbine;
 cooling the partial mass flow; and
 subsequently guiding the cooled partial mass flow, together with a residual mass flow, to the steam turbine, wherein the partial mass flow is cooled by injecting a flow of water.

17. The method as claimed in claim 16, wherein a temperature of the cooled partial mass flow is measured downstream of the cooling location.

18. The method as claimed in claim 16, wherein the cooled partial mass flow and the residual mass flow are fed, separately from one another, into the steam turbine.

19. A method for cooling, comprising:
 branching off a partial mass flow upstream of a supply system for supplying steam to the steam turbine;
 cooling the partial mass flow; and
 subsequently guiding the cooled partial mass flow, together with a residual mass flow, to the steam turbine, wherein a temperature of the cooled partial mass flow is measured downstream of the cooling location.

20. The method as claimed in claim 19, wherein the cooled partial mass flow and the residual mass flow are fed, separately from one another, into the steam turbine.

21. A method for cooling, comprising:
 branching off a partial mass flow upstream of a supply system for supplying steam to the steam turbine;
 cooling the partial mass flow; and
 subsequently guiding the cooled partial mass flow, together with a residual mass flow, to the steam turbine, wherein the cooled partial mass flow and the residual mass flow are fed, separately from one another, into the steam turbine.

22. An appliance for cooling, comprising:
 a live steam main; and
 a supply system for supplying steam to the steam turbine, wherein the live steam main includes a branch for abstracting a partial mass flow to be cooled, the partial mass flow being returned to the supply system, together with a residual mass flow, downstream of a cooling device for the partial mass flow, wherein the branch leads to a heat exchanger, which is cooled by a fluid extracted from a principal feed main.

23. The appliance as claimed in claim 22, further comprising:
 a temperature sensor for measuring the temperature of the cooled partial mass flow, arranged at the cooling location.

24. The appliance as claimed in claim 23, wherein at least one of the heat exchanger and the cooling chamber is provided with a drainage system.

25. The appliance as claimed in claim 22, wherein at least one of the heat exchanger and the cooling chamber is provided with a drainage system.

26. The appliance as claimed in claim 25, wherein the supply system includes a nozzle for the residual mass flow and a further nozzle for the cooled partial mass flow.

27. The appliance as claimed in claim 22, wherein the supply system includes a nozzle for the residual mass flow and a further nozzle for the cooled partial mass flow.

28. The appliance as claimed in claim 23, wherein the supply system includes a nozzle for the residual mass flow and a further nozzle for the cooled partial mass flow.

29. An appliance for cooling, comprising:
 a live steam main; and
 a supply system for supplying steam to the steam turbine, wherein the live steam main includes a branch for abstracting a partial mass flow to be cooled, the partial mass flow being returned to the supply system, together with a residual mass flow, downstream of a cooling device for the partial mass flow, wherein the branch leads to the cooling chamber, into which water extracted from a principle feed main is injectable.

30. The appliance as claimed in claim 29, further comprising:
 a temperature sensor for measuring the temperature of the cooled partial mass flow, arranged at the cooling location.

31. The appliance as claimed in claim 29, wherein at least one of the heat exchanger and the cooling chamber is provided with a drainage system.

32. The appliance as claimed in claim 29, wherein the supply system includes a nozzle for the residual mass flow and a further nozzle for the cooled partial mass flow.

33. An appliance for cooling, comprising:
 a live steam main; and
 a supply system for supplying steam to the steam turbine, wherein the live steam main includes a branch for abstracting a partial mass flow to be cooled, the partial mass flow being returned to the supply system, together with a residual mass flow, downstream of a cooling device for the partial mass flow, wherein the supply system includes a nozzle for the residual mass flow and further nozzle for the cooled partial mass flow.

* * * * *